US009760421B2

(12) United States Patent
Souda et al.

(10) Patent No.: US 9,760,421 B2
(45) Date of Patent: Sep. 12, 2017

(54) INFORMATION PROCESSING DEVICE, METHOD, AND COMPUTER READABLE MEDIUM

(71) Applicant: FUJITSU LIMITED, Kawasaki-shi, Kanagawa (JP)

(72) Inventors: Tatsuhiro Souda, Yokohama (JP); Satoru Fukuda, Yokohama (JP); Tomohiro Miura, Itabashi (JP); Masafumi Inaoka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/069,348

(22) Filed: Mar. 14, 2016

(65) Prior Publication Data
US 2016/0275001 A1    Sep. 22, 2016

(30) Foreign Application Priority Data
Mar. 18, 2015   (JP) ................................ 2015-055006

(51) Int. Cl.
G06F 9/44     (2006.01)
G06F 11/07    (2006.01)

(52) U.S. Cl.
CPC ...... *G06F 11/0751* (2013.01); *G06F 11/0724* (2013.01)

(58) Field of Classification Search
CPC ....................................................... G06F 9/44
USPC ................................................ 717/134–138
See application file for complete search history.

(56) References Cited

U.S. PATENT DOCUMENTS

| 6,047,361 | A | * | 4/2000 | Ingenio | ............... G06F 13/1694 365/233.1 |
| 2006/0136692 | A1 | * | 6/2006 | Lovett | ................. G06F 13/1689 711/167 |
| 2012/0084792 | A1 | * | 4/2012 | Benedek | ................. G06F 9/544 719/313 |

FOREIGN PATENT DOCUMENTS

| JP | 3-158936 | 7/1991 |
| JP | 5-2500 | 1/1993 |
| JP | 8-77039 | 3/1996 |

* cited by examiner

*Primary Examiner* — Jae Jeon
(74) *Attorney, Agent, or Firm* — Staas & Halsey LLP

(57) ABSTRACT

An information processing device includes a plurality of processors. One of the plurality of processors is configured to: acquire a first code from a plurality of codes included in a program to be emulated; determine whether or not that a plurality of native codes corresponding to the acquired first code are for the atomic operation and that the first code accesses a memory; and generate a modified native code string with delay in which a certain code for delaying the completion of executing the plurality of native codes is inserted in the plurality of native codes corresponding to the first code when the one of the plurality of processors determined that the plurality of native codes corresponding to the first code are not for the atomic operation and that the first codes accesses the memory.

9 Claims, 12 Drawing Sheets

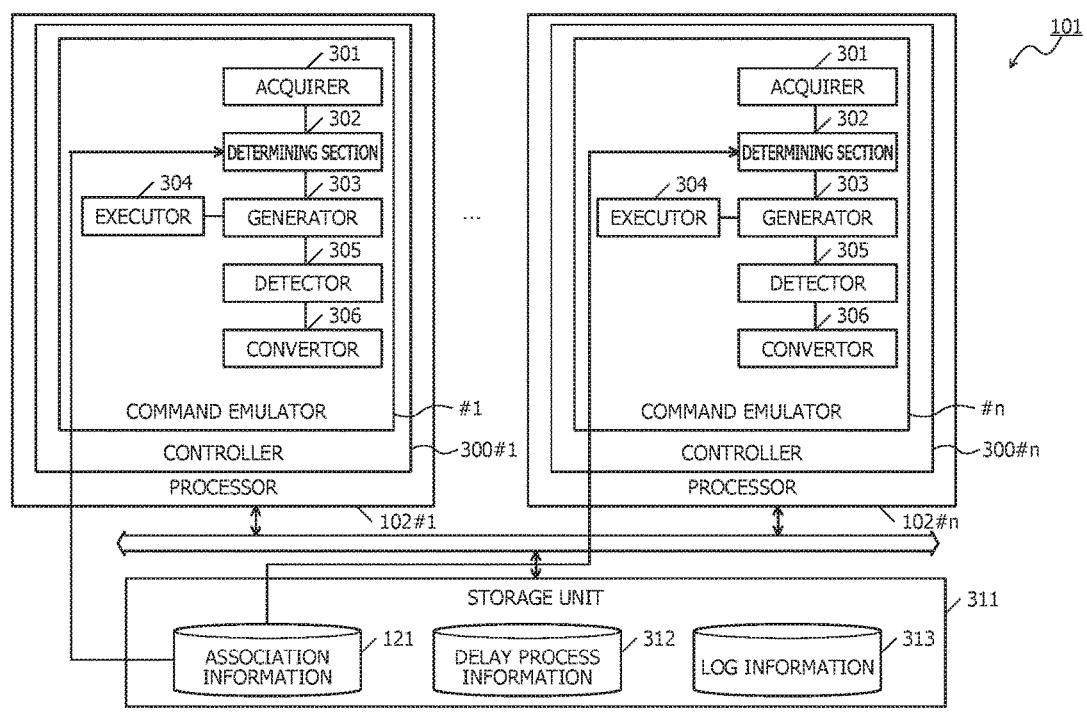

FIG. 4

| SPECIFIC COMMAND CODE | | COMMAND CODE CONVERSION DEFINITION | | | ATOMIC SPECIFIC COMMAND CODE | |
|---|---|---|---|---|---|---|
| COMMAND CODE | COMMAND CODE TYPE | NATIVE CODE | ATOMICITY | NATIVE CODE STRING WITH DELAY | | |
| A1 | COMPUTATION | α1 | — | — | — | 401-1 |
| B1 | COMPUTATION | β1, β2 | — | — | — | 401-2 |
| ⋮ | ⋮ | ⋮ | ⋮ | ⋮ | ⋮ | |
| X1 | MEMORY OPERATION | χ1 | ATOMIC | — | — | 401-3 |
| Y1 | MEMORY OPERATION | ψ1, ψ2 | NON-ATOMIC | ψ1, DELAY PROCESS CODE STRING, ψ2 | Z1 | 401-4 |
| ⋮ | ⋮ | ⋮ | ⋮ | ⋮ | ⋮ | |
| Z1 | MEMORY OPERATION | INTER-PROCESSOR EXCLUSIVE ACQUISITION CODE STRING, ψ1, ψ2, INTER-PROCESSOR EXCLUSIVE RELEASE CODE STRING | ATOMIC | — | — | 401-5 |
| ⋮ | ⋮ | ⋮ | ⋮ | ⋮ | ⋮ | |

ASSOCIATION INFORMATION 121

FIG. 5

| PASSAGE OF TIME (TIME) | COMMAND EMULATOR #1 | | | COMMAND EMULATOR #2 | | | COMMAND EMULATOR #n | | |
|---|---|---|---|---|---|---|---|---|---|
| | COMMAND CODE | | RESULT OF INTERPRETING COMMAND CODE | COMMAND CODE | | RESULT OF INTERPRETING COMMAND CODE | COMMAND CODE | | RESULT OF INTERPRETING COMMAND CODE |
| | TYPE OF COMMAND CODE | ATOMICITY | | TYPE OF COMMAND CODE | ATOMICITY | | TYPE OF COMMAND CODE | ATOMICITY | |
| ↓(t1) | COMPUTATION | - | INSTANTANEOUS | MEMORY OPERATION | ATOMIC | INSTANTANEOUS | COMPUTATION | - | INSTANTANEOUS |
| ↓(t2) | COMPUTATION | - | INSTANTANEOUS | COMPUTATION | - | INSTANTANEOUS | MEMORY OPERATION | ATOMIC | INSTANTANEOUS |
| ↓(t3) | | | | COMPUTATION | - | INSTANTANEOUS | MEMORY OPERATION | ATOMIC | INSTANTANEOUS |
| ↓(t4) | | | | BRANCHING | - | INSTANTANEOUS | COMPUTATION | - | INSTANTANEOUS |
| → | | | DELAYED | | | | ... | ... | ... |
| ↓(t5) | MEMORY OPERATION | NON-ATOMIC | | MEMORY OPERATION | NON-ATOMIC | INSTANTANEOUS | BRANCHING | - | INSTANTANEOUS |
| → | | | | BRANCHING | - | INSTANTANEOUS | COMPUTATION | - | INSTANTANEOUS |
| → | | | | COMPUTATION | - | INSTANTANEOUS | MEMORY OPERATION | NON-ATOMIC | INSTANTANEOUS |
| ↓(t6) | | | | MEMORY OPERATION | ATOMIC | INSTANTANEOUS | COMPUTATION | - | INSTANTANEOUS |
| ↓(t7) | COMPUTATION | - | INSTANTANEOUS | COMPUTATION | - | INSTANTANEOUS | COMPUTATION | - | INSTANTANEOUS |
| → | BRANCHING | - | INSTANTANEOUS | MEMORY OPERATION | NON-ATOMIC | INSTANTANEOUS | MEMORY OPERATION | NON-ATOMIC | DELAYED |
| → | BRANCHING | - | INSTANTANEOUS | | | | | | |
| ↓(t8) | BRANCHING | - | INSTANTANEOUS | BRANCHING | - | INSTANTANEOUS | MEMORY OPERATION | ATOMIC | INSTANTANEOUS |
| → | BRANCHING | - | INSTANTANEOUS | COMPUTATION | - | INSTANTANEOUS | COMPUTATION | - | INSTANTANEOUS |
| → | MEMORY OPERATION | ATOMIC | INSTANTANEOUS | | | | BRANCHING | - | INSTANTANEOUS |
| ↓(t9) | COMPUTATION | - | INSTANTANEOUS | | | | MEMORY OPERATION | NON-ATOMIC | OUTPUT OF LOG INFORMATION |
| ↓(t10) | MEMORY OPERATION | NON-ATOMIC | INSTANTANEOUS | MEMORY OPERATION | NON-ATOMIC | INSTANTANEOUS | MEMORY OPERATION | ATOMIC | INSTANTANEOUS |
| → | MEMORY OPERATION | NON-ATOMIC | INSTANTANEOUS | | | | MEMORY OPERATION | ATOMIC | INSTANTANEOUS |
| → | MEMORY OPERATION | NON-ATOMIC | INSTANTANEOUS | | | | | | |
| ↓(t11) | BRANCHING | - | INSTANTANEOUS | | | | COMPUTATION | - | INSTANTANEOUS |
| → | MEMORY OPERATION | NON-ATOMIC | INSTANTANEOUS | MEMORY OPERATION | ATOMIC | INSTANTANEOUS | COMPUTATION | - | INSTANTANEOUS |
| → | COMPUTATION | - | INSTANTANEOUS | | | | BRANCHING | - | INSTANTANEOUS |
| | | | | | | | COMPUTATION | - | INSTANTANEOUS |

| EXECUTION | DELAY COMMAND EMULATOR NUMBER | MEMORY ADDRESS INFORMATION | MEMORY OPERATION TYPE |
|---|---|---|---|
| ABSENCE | — | — | — |

_312_t3_

| EXECUTION | DELAY COMMAND EMULATOR NUMBER | MEMORY ADDRESS INFORMATION | MEMORY OPERATION TYPE |
|---|---|---|---|
| EXISTENCE | #1 | ... | WRITING |

_312_t7_

| EXECUTION | DELAY COMMAND EMULATOR NUMBER | MEMORY ADDRESS INFORMATION | MEMORY OPERATION TYPE |
|---|---|---|---|
| EXISTENCE | #n | ... | READING |

_312_t9_

| EXECUTION | DELAY COMMAND EMULATOR NUMBER | MEMORY ADDRESS INFORMATION | MEMORY OPERATION TYPE |
|---|---|---|---|
| EXISTENCE | #2 | ... | WRITING |

FIG. 7

| COMPETITION DETECTION TIME | INFORMATION OF COMMAND EMULATOR THAT EXECUTES DELAY PROCESS | | INFORMATION OF COMMAND EMULATOR THAT DETECTS COMPETITION | | |
|---|---|---|---|---|---|
| | COMMAND EMULATOR NUMBER | SPECIFIC COMMAND CODE ADDRESS | COMMAND EMULATOR NUMBER | SPECIFIC COMMAND CODE ADDRESS | |
| 15:31, DECEMBER 4, 2014 | #2 | 0x000ABCDE | #n | 0x000ABC0C | 701-1 |
| ⋮ | ⋮ | ⋮ | ⋮ | ⋮ | |
| 16:32, DECEMBER 4, 2014 | #1 | 0x000AB00A | #2 | 0x000AB10A | 701-2 |
| | | | ⋮ | ⋮ | |

LOG INFORMATION / 313

INFORMATION PROCESSING DEVICE, METHOD, AND COMPUTER READABLE MEDIUM

CROSS-REFERENCE TO RELATED APPLICATION

This application is based upon and claims the benefit of priority of the prior Japanese Patent Application No. 2015-055006, filed on Mar. 18, 2015 the entire contents of which are incorporated herein by reference.

FIELD

The embodiment discussed herein is related to an information processing device, a method and a computer readable medium.

BACKGROUND

Traditionally, there is a technique for causing a certain processor to emulate the execution of a program described using a command set that is included in another processor and different from a command set included in the certain processor. In addition, there is a technique for testing a program executed by multiple processors to check whether or not exclusive control is appropriately executed on a memory shared by and accessible from the multiple processors.

As related art, a technique for activating a periodic activation program during the execution of another specific program by a processor among multiple processors and stopping the periodic activation program after the termination of the execution of the specific program has been disclosed, for example. In addition, for a multi-program system in which multiple programs may be executed in parallel, there is a technique for delaying the execution of commands of the programs that are being executed and thereby increasing a time period for which a hardware resource shared by the programs is used. Furthermore, for a multi-processor system, there is a technique for providing an instruction to cancel the interruption of the execution of a program in a state in which all processors interrupt the program at program interruption points for the processors, simultaneously restarting the execution of the program, and testing exclusive control to be executed on an information resource.

As examples of related art, Japanese Laid-open Patent Publications Nos. 08-77039, 03-158936, and 05-2500 are known.

According to the conventional techniques, however, it is difficult to detect a failure, occurred during the time when a certain processor among multiple processes configured to emulate the execution of a program to be emulated emulates the execution of a code for accessing a memory, of exclusive control executed on the memory. Specifically, as a time period for which the certain processor emulates the execution of the code for accessing the memory is shorter, a probability at which another processor emulates the execution of the code for accessing the memory within the time period is lower. It is, therefore, difficult to detect the failure of the exclusive control executed on the memory.

SUMMARY

According to an aspect of the invention, an information processing device includes a plurality of processors. One of the plurality of processors is configured to: acquire a first code from a plurality of codes included in a program to be emulated; determine whether or not that a plurality of native codes corresponding to the acquired first code are for the atomic operation and that the first code accesses a memory; and generate a modified native code string with delay in which a certain code for delaying the completion of executing the plurality of native codes is inserted in the plurality of native codes corresponding to the first code when the one of the plurality of processors determined that the plurality of native codes corresponding to the first code are not for the atomic operation and that the first codes accesses the memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a block diagram illustrating an example of a functional configuration of the information processing device;

FIG. 4 is an explanatory diagram illustrating an example of stored details of association information;

FIG. 5 is an explanatory diagram illustrating an example of the emulation of specific command codes by command emulators;

FIG. 6 is an explanatory diagram describing an example of stored details of delay process information;

FIG. 7 is an explanatory diagram illustrating an example of log information;

DESCRIPTION OF EMBODIMENT

According to an aspect of an embodiment, a failure of exclusive control executed on a memory during the time when multiple processors emulate the execution of a program to be emulated may be easily detected. The embodiment of an information processing device disclosed herein and an emulator program disclosed herein is described in detail with reference to the accompanying drawings.

Figure 1:
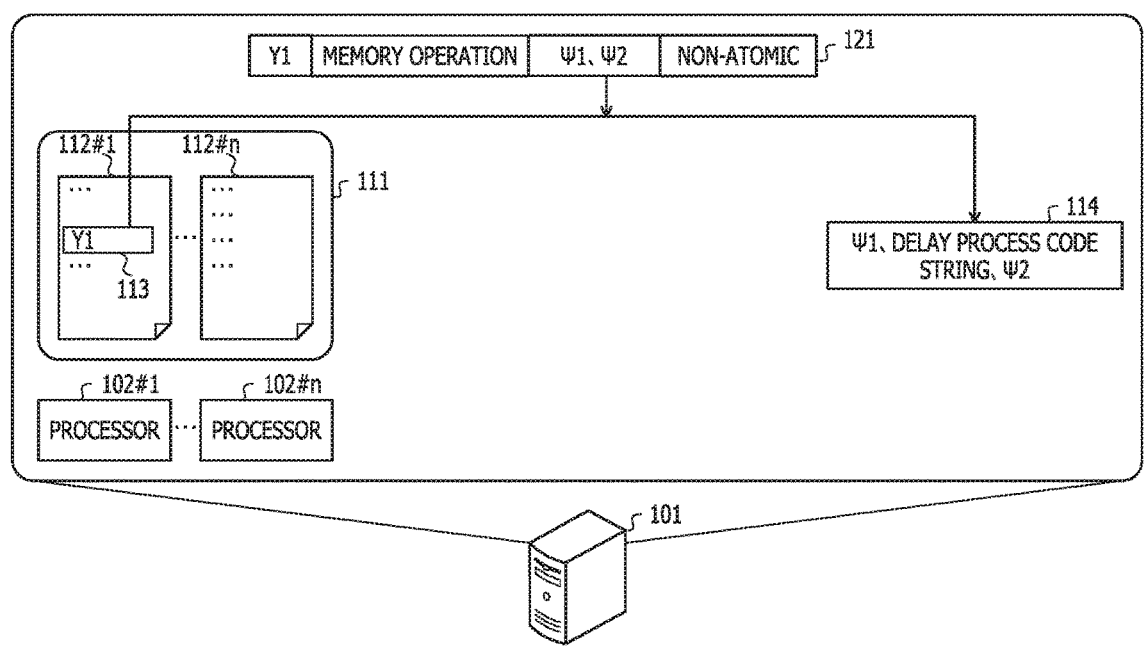
FIG. 1 is a diagram describing an example of operations of an information processing device according to an embodiment.

FIG. 1 is an explanatory diagram illustrating an example of operations of an information processing device 101 according to the embodiment. The information processing device 101 is a computer including multiple processors 102#1 to 102#n. In this case, n is a natural number of 2 or larger. The information processing device 101 causes multiple processors to emulate the execution of a processor to be emulated and having a command set different from the multiple processors and thereby emulates the execution of a program 111 to be emulated and described using the command set of the processor to be emulated.

Command emulators are provided as software for converting command codes included in the command set of the processor to be emulated into native codes executable by each of the multiple processors and executing the converted codes. The processors execute the command emulators and thereby emulate the execution of the program 111 to be emulated. In the following description, a command code that is included in the command set of the processor to be emulated and is not a native code is referred to as a "specific command code" in some cases. In addition, a command code that is not a native code is merely referred to as a "code" in some cases. Results of executing the program 111 to be emulated may be obtained by using the command emulators without modifying the program 111 to be emulated to a program for multiple processors.

A part to be subjected to the exclusive control may not be subjected to the exclusive control due to multiple operations for accessing the memory or a failure of the exclusive control may occur when multiple processors emulate the execution of the program to be emulated. As a method of achieving the exclusive control, the multiple operations for accessing the memory are treated as an atomic operation in some cases. The atomic operation is an operation that inhibits another person from inserting an operation between the multiple operations during the multiple operations. In the following description, a code for the atomic operation is referred to as an "atomic" code, and a code that is not for the atomic operation is referred to as a "non-atomic" code.

An example in which a failure of the exclusive control occurs is described below using a non-atomic specific command code 1 for executing an operation of writing a register's value in the memory and an atomic specific command code 2 for executing an operation of reading from the memory in which the value is written in accordance with the command code 1. It is assumed that the specific command code 1 is converted into a native code for writing a value of a first native register in the memory and a native code for writing a value of a second native register in the memory. In this case, it is assumed that a single register of the processor to be emulated is emulated by the first and second native registers.

An example in which a failure of the exclusive control occurs is a case where during the time when a certain processor among multiple processors emulates the execution of the command code 1, the other processor emulates the execution of the command code 2. Specifically, after the certain processor writes the value of the first native register and the other processor executes a native code obtained by converting the command code 2 after the writing by the certain processor, the certain processor writes the value of the second native register. In this case, the result of reading the command code 2 is data in which the value of the first native register is written and data in which the value of the second native register is not written. Thus, the following failure occurs: the data before and after the writing in accordance with the command code 1 exists in the memory.

In addition, an example in which a failure of the exclusive control occurs is described below using an atomic specific atomic command code 3 for executing an operation of writing a value of a register in the memory and a non-atomic specific command code 4 for executing an operation of reading from the memory in which the value is written in accordance with the command code 3. It is assumed that the specific command code 4 is converted into a native code for reading a value of a first native register from the memory and a native code for reading a value of a second native register from the memory as multiple native codes. In this case, it is assumed that a single register of the processor to be emulated is emulated by the first and second native registers.

Another example in which a failure of the exclusive control occurs is a case where during the time when a certain processor among the multiple processors emulates the execution of the command code 4, the other processor emulates the execution of the command code 3. Specifically, after the certain processor reads the value of the first native register and the other processor executes a native code obtained by converting the command code 3 after the reading by the certain processor, the certain processor reads the value of the second native register. In this case, the result of reading the command code 4 is data before the writing of the value of the first native register and data after the writing of the value of the second native register. Thus, the following failure occurs: the data before and after the writing in accordance with the command code 3 exists in the memory.

As describe above, if a command code for executing an operation of accessing the memory for the emulation of a specific command code is not atomic, a detail of the memory is temporarily a value that does not exist in the processor to be emulated, and the detail of the memory causes the occurrence of a failure of the exclusive control. The occurrence of a failure of the exclusive control executed for a memory operation depends on the timing of mutual operations of the processors. In the operations, the other processor executes an operation on data within the memory in a short time period that is a nanosecond-scale time period or the like and for which the certain processor executes an operation on data within the same memory. Thus, in a general testing method, the above situation is rare or occurs once every one to several years, for example. Thus, it is difficult to cause the above situation to occur within a short time period.

For example, it is considered that time intervals at which shared data is updated are increased and a probability at which competition between access to the same memory region occurs is increased by giving an interruption delay to each of all command codes of the program 111 to be emulated or to each of command codes of a specified range of the program 111 to be emulated. In this case, however, since the delay is given to each of the command codes, a time period for which a certain processor emulates the execution of a code that is included in the program 111 to be emulated and is to be executed to access the memory is not increased.

If a specific command code to be emulated is for a memory operation and is associated with multiple non-atomic native codes, the information processing device 101 according to the embodiment generates a native code string including a delay process between the native codes. During the execution of the delay process by a certain processor, a memory operation to be executed by another processor is increased by the execution of the native code string including the delay process. Thus, a failure of the exclusive control is easily detected.

Operations of the information processing device 101 are described with reference to FIG. 1. In the example illustrated in FIG. 1, the processors 102#1 to 102#n that are included in the information processing device 101 cause the command emulators of the processors 102#1 to 102#n to emulate the execution of the program 111 to be emulated. Specifically, the processor 102#1 emulates the execution of a code group 112#1 included in the program 111 to be emulated, and the processor 102#n emulates the execution of a code group 112#n included in the program 111 to be emulated. The processor 102#1 that servers as a processor 102 among the processors 102#1 to 102#n acquires a code 113 as a first code from the program 111 to be emulated. For example, the processor 102#1 acquires the code 113 when the execution of the code 113 is determined to be emulated. Alternatively, the processor 102#1 may acquire the overall code group 112#1 when the execution of the code group 112#1 is determined to be emulated by the processor 102#1.

Next, the processor 102#1 references association information 121 and determines whether or not multiple native codes associated with the acquired code 113 are non-atomic native codes and whether or not the type of the code 113 indicates access to the memory. The association information 121 is information in which one or multiple native codes associated with each of codes included in the program 111 to be emulated, the type of each of the codes, and information indicating whether or not one or multiple native codes associated with each of the codes are for the atomic operation are associated with each other. The stored details of the association information 121 are described in detail with reference to FIG. 4.

In order to simplify the description, in the following description and some of the accompanying drawings, codes that are each indicated by "a single alphabet and a single number" are specific command codes, and codes that are each indicated by "a single Greek alphabet and a single number" are native codes. The association information 121 illustrated in FIG. 1 indicates that a specific command code Y1 is associated with native codes $\Psi1$ and $\Psi2$, the type of the specific command code Y1 indicates a "memory operation" for accessing the memory, and the native codes $\Psi1$ and $\Psi2$ are not atomic. Since the native codes $\Psi1$ and $\Psi2$ are not atomic, another native code is permitted to be inserted between the native codes $\Psi1$ and $\Psi2$ by a processor other than the processor 102#1.

Since the non-atomic native codes associated with the specific command code are two native codes or more, the processor 102#1 may not determine whether or not the acquired code 113 is associated with multiple native codes and it is sufficient if the processor 102#1 determines whether or not the acquired code 113 is atomic. The number of atomic native codes associated with a specific command code may be one or two or more.

If the processor 102#1 determines that the multiple native codes associated with the code 113 are not atomic and that the types of the code 113 indicates access to the memory, the processor 102#1 generates a native code string 114 with delay that is associated with the code 113.

The native code string 114 with delay is a native code string in which a code for delaying the completion of the execution of the multiple native codes associated with the specific command code is inserted between two of the multiple native codes. Hereinafter, the code for delaying the completion of the execution of the multiple native codes may be a single native code or multiple native codes. The code for delaying the completion of the execution of the multiple native codes is hereinafter referred to as a "delay process code string".

The delay process code string is the code for executing the delay process in accordance with a delay time specified by an operator of the information processing device 101 upon a test. For example, an example of the code for executing the delay process is a code for repeatedly confirming a clock counter until the clock counter indicates the specified value. If the program 111 to be emulated is executed only to access the memory, an execution time of each native code is one nanosecond, and the size of the program 111 to be emulated is 1000 steps, the information processing device 101 specifies the delay time of approximately 3 microseconds in accordance with an instruction by the operator, for example. Alternatively, if the program 111 to be emulated includes a process of inputting and outputting from and to an external storage device, and a time period for executing the inputting and outputting process is 1 millisecond, the information processing device 101 specifies the delay time of approximately 3 milliseconds in accordance with an instruction by the operator, for example.

If the multiple native codes associated with the specific command code are three native codes as an example of the native code string 114 with delay, the processor 102 that generates the native code string 114 with delay may inserts the delay process code string between first and second native codes among the three native codes or insert the delay process code string between the second native code and a third native node among the three native codes. Alternatively, the processor 102 that generates the native code string 114 with delay may insert the delay process code string between the first and second native codes and between the second and third native codes.

The information processing device 101 may store, in the association information 121, the native code string 114 with delay that is associated with the specific command code. The processor 102 that generates the native code string 114 with delay may acquire, from the association information 121, the native code string 114 with delay that is associated with the acquired specific command code, as the generation of the native code string 114 with delay.

In the example illustrated in FIG. 1, the processor 102#1 generates the native code $\Psi1$, the delay process code string, and the native code $\Psi2$ as the native code string 114 with delay. Then, the processor 102#1 executes the native code string 114 with delay. Since a time period for which the processor 102#1 emulates the execution of the code 113 acquired by the processor 102#1 is increased by the execution of the native code string 114 with delay, a failure of the exclusive control executed on the memory for the emulation of another processor 102 may easily occur. Next, an example of a hardware configuration of the information processing device 101 is described with reference to FIG. 2.

Example of Hardware Configuration of Information Processing Device 101

Figure 2:
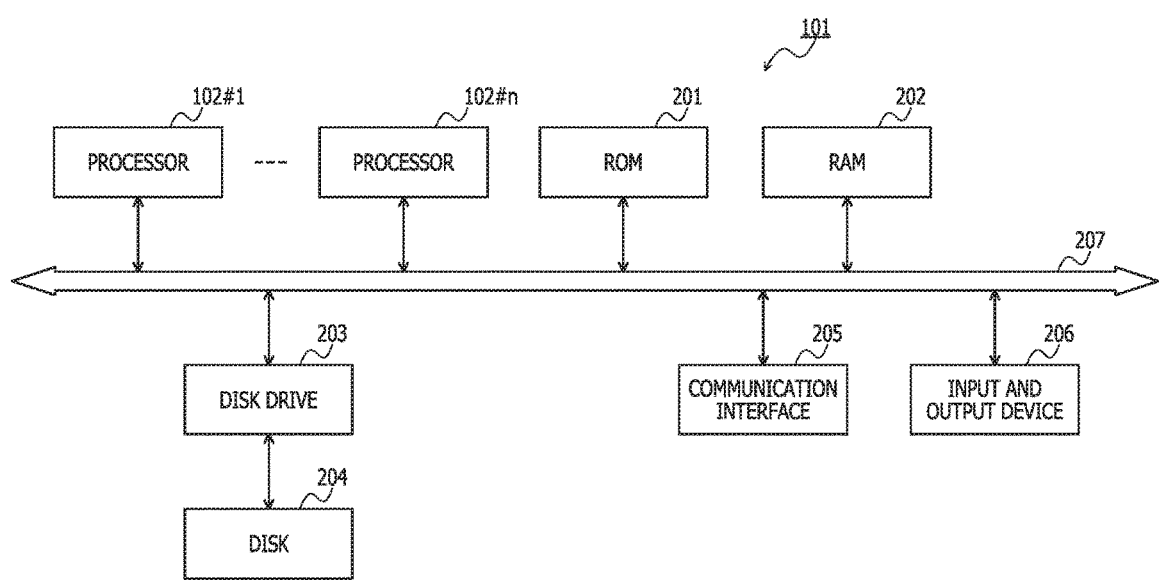
FIG. 2 is a block diagram illustrating an example of a hardware configuration of the information processing device.

FIG. 2 is a block diagram illustrating the example of the configuration of the information processing device 101. The information processing device 101 includes the processors 102#1 to 102#n, a read only memory (ROM) 201, and a random access memory (RAM) 202. The information processing device 101 also includes a disk drive 203, a disk 204, a communication interface 205, and an input and output device 206. The processors 102, the ROM 201, the RAM 202, the disk drive 203, the communication interface 205, and the input and output device 206 are connected to each other by a bus 207.

Since the information processing device 101 includes the multiple processors 102#1 to 102#n, the information processing device 101 may serve as a multi-processor system. The information processing device 101 may be a system including a multi-core processor. The multi-core processor is a processor including multiple cores. The information processing device 101 may be a server, a personal computer, a mobile phone, or the like, for example.

The processors 102#1 to 102#*n* are arithmetic processing devices for controlling the overall information processing device 101. The ROM 201 is a nonvolatile memory for storing programs such as a boot program. The RAM 202 is a volatile memory to be used as work areas of the processors 102#1 to 102#*n*.

The disk drive 203 is a control device for controlling reading and writing of data from and in the disk 204 under control by the processors 102. As the disk drive 203, a magnetic disk drive, an optical disc drive, a solid state drive, or the like may be used, for example. The disk 204 is a nonvolatile memory for storing data written under control by the disk drive 203. For example, if the disk drive 203 is a magnetic disk drive, a magnetic disk may be used as the disk 204. If the disk drive 203 is an optical disc drive, an optical disc may be used as the disk 204. If the disk drive 203 is a solid state drive, a semiconductor memory formed of semiconductor elements or a so-called semiconductor disk may be used as the disk 204.

The communication interface 205 is a control device serving as an interface between a network and the inside of the information processing device 101 and configured to control input and output of data from and to another device. Specifically, the communication interface 205 is connected to the other device through a communication line and the network. As the communication interface 205, a modem, a local area network (LAN) adaptor, or the like may be used.

The input and output device 206 is a device configured to cause data to be input to and output from the information processing device 101. For example, the input and output device 206 is a keyboard, a touch panel, a display, or the like. The input and output device 206 is used for display of a process result, input of an instruction from the operator operating the information processing device 101, and the like.

Example of Functional Configuration of Information Processing Device 101

FIG. 3 is a block diagram illustrating an example of a functional configuration of the information processing device 101. The processors 102#1 to 102#*n* included in the information processing device 101 include controllers 300#1 to 300#*n*, respectively. The controllers 300#1 to 300#*n* include command emulators #1 to #*n*, respectively. The command emulators #1 to #*n* each include an acquirer 301, a determining section 302, a generator 303, an executor 304, a detector 305, and a convertor 306. The controllers 300#1 to 300#*n* achieve functions of the sections by causing the processors 102#1 to 102#*n* to execute an emulator program stored in a storage device and serving as a program of the command emulators. The storage device is the ROM 201 illustrated in FIG. 2, the RAM 202 illustrated in FIG. 2, the disk 204 illustrated in FIG. 2, or the like. Results of processes executed by the sections are stored in registers of the processors 102#1 to 102#*n*, cache memories of the processors 102#1 to 102#*n*, or the like.

The processors 102#1 to 102#*n* may access a storage unit 311. The storage unit 311 is a part of a storage region of the RAM 202, for example. The storage unit 311 includes the association information 121, delay process information 312, and log information 313.

The association information 121 is information in which specific command codes are associated with native codes obtained by converting the specific command codes. The association information 121 may store association relationships between certain codes associated with native codes that are not for the atomic operation and codes having the same functions as the certain codes and associated with native codes that are for the atomic operation. The association information 121 may store, as the association relationships, the codes having the same functions as the certain codes and associated with the native codes that are for the atomic operation. The association information 121 may store, as the association relationships, pointers pointing to storage regions storing the codes having the same functions as the certain codes and associated with the native codes that are for the atomic operation. An example of stored details of the association information 121 is illustrated in FIG. 4.

The delay process information 312 stores information on a processor 102 that executes the native code string 114 with delay. An example of stored details of the delay process information 312 is illustrated in FIG. 6. The log information 313 is information output by a command emulator that detected competition. An example of stored details of the log information 313 is illustrated in FIG. 7.

The command emulators #1 to #*n* are associated with the processors 102#1 to 102#*n*, respectively, at a stage of activating the command emulators #1 to #*n*. However, if the processors 102 are a multi-core processor or the like that is formed by integrating circuits configured to execute commands in parallel, the command emulators #1 to #*n* are associated with cores of the multi-core processor or the like, respectively. If the command emulators execute a program group of an operating system (OS) including a kernel, the command emulators are treated as firmware.

The acquirer 301 acquires, from the program 111 to be emulated, a first code of which the execution is to be emulated by a certain processor 102 among the processors 102#1 to 102#*n*.

The determining section 302 references the association information 121 and determines whether or not multiple native codes associated with the first code acquired by the acquirer 301 are non-atomic native codes and whether or not the type of the first code indicates access to the memory. The determining section 302 may determine whether or not another processor 102 that is among the processors 102#1 to 102#*n* and is not the certain processor 102 executes a native code string 114 with delay that is associated with a second code included in the program 111 to be emulated. The second code may be different from the first code or may be the same as the first code. For example, if the certain processor 102 and the other processor 102 call the same subroutine included in the program 111 to be emulated, the first code may be the same as the second code.

A condition, in which the multiple native codes associated with the first code are not atomic, the type of the first code indicates access to the memory, and the other processor 102 is not executing the native code string 114 with delay, is referred to as a condition A. In addition, a condition, in which the type of the first code indicates access to the memory and the other processor 102 is executing the native code string 114 with delay, is referred to as a condition B. A condition other than the conditions A and B is referred to as a condition C.

If the determining section 302 determines that the multiple native codes associated with the first code are not atomic and that the type of the first code indicates access to the memory, the generator 303 references the association information 121 and generates the native code string 114 with delay that is associated with the first code.

The executor 304 executes the native codes associated with the first code or the native code string 114 with delay that is associated with the first code and generated by the generator 303. Only if the condition A is satisfied, the executor 304 may execute the native code string 114 with delay that is associated with to the first code. If the condition A is satisfied, the generator 303 may generate the native code string 114 with delay that is associated with the first code, and if the condition A is not satisfied, the generator 303 may generate the native codes that are associated with the first code.

It is assumed that the determining section 302 determines that the type of the first code indicates access to the memory. In this case, the detector 305 detects competition between access to the memory by the native codes associated with the first code and access to the memory by the native code string 114 with delay that is associated with the second code. Only if the condition B is satisfied, the detector 305 may detect the competition between the access to the memory by the native codes associated with the first code and the access to the memory by the native code string 114 with delay that is associated with the second code.

If the detector 305 detects the competition, the convertor 306 references the association information 121 and converts the second code into a code having the same function as the second code and associated with a native code for the atomic operation. In the example illustrated in FIG. 1, the association information 121 stores an association relationship between the specific command code Y1 and a specific command code Z1 having the same function as the code Y1 and associated with a native code that is for the atomic operation. If the second code is assumed to be the code Y1 and the detector 305 detects the competition, the convertor 306 converts, into the code Z1, the code Y1 that is the second code within the program 111 to be emulated.

FIG. 4 is an explanatory diagram illustrating an example of stored details of the association information 121. The association information 121 is information in which specific command codes are associated with native codes obtained by converting the specific command codes. The association information 121 illustrated in FIG. 4 has records 401-1 to 401-5.

The association information 121 includes a specific command code field, a command code conversion definition field, and an atomic specific command code field. The specific command code field includes a command code field and a command code type field. In the command code field, specific command codes are stored. In the command code type field, identification information that indicates the types of the specific command codes is stored. Specifically, in the command code type field, a "computation" identifier that indicates that a specific command code is a code for executing computation, a "memory operation" identifier that indicates that a specific command code is a code for accessing the memory, and the like are stored.

The command code conversion definition field includes a native code field, an atomicity field, and a field for a native code string with delay. In the native code field, native codes associated with the specific command codes are stored. Each of the specific command codes may be associated with a single native code or multiple native codes. If a specific command code is associated with multiple native codes, a processor 102 executes the multiple native codes in the order indicated in the native code field.

In the atomicity field, identification information that indicates whether or not the native codes are atomic is stored. Specifically, in the atomicity field, an "atomic" identifier that indicates that a native node is atomic, a "non-atomic" identifier that indicates that a native node is not atomic, and the like are stored. In the field for a native code string with delay, a native code string with delay that is associated with a specific command code is stored.

In the atomic specific command code field, a command code that has the same function as a specific code stored in the command code field and is associated with a native code that is for the atomic operation is stored.

For example, the record 401-4 indicates that the specific command code is "Y1" and that the type of the command code indicates a "memory operation". In addition, the record 401-4 indicates that native codes associated with "Y1" are "Ψ1" and "Ψ2" and are not atomic and that a native code string with delay is "Ψ1, the delay process code string, and Ψ2". Furthermore, the record 401-4 indicates that an atomic specific command code associated with "Y1" is "Z1".

The record 401-5 indicates that the specific command code is "Z1 and that the type of the command code indicates a "memory operation". In addition, the record 401-5 indicates that native codes associated with "Z1 are "an inter-processor exclusive acquisition code string, Ψ1, Ψ2, and an inter-processor exclusive release code string" and are atomic".

Next, a method of testing the exclusive control of the program 111 to be emulated by the command emulators is described with reference to FIGS. 5 to 7.

FIG. 5 is an explanatory diagram illustrating the emulation of specific command codes by the command emulators. FIG. 6 is an explanatory diagram illustrating stored details of the delay process information 312. A table 501 illustrated in FIG. 5 indicates results obtained by executing specific command codes by the command emulators #1 to #n at times t1 to t11. The table 501 indicates information extracted from the records of the association information 121 and indicating the types of the specific command codes of which the execution is emulated and indicating whether or not native codes associated with the specific command codes are atomic. In addition, the table 501 indicates results of interpreting the specific command codes of which the execution is emulated. At the times t1 and t2, any command emulator does not execute the delay process, the type of a specific command code indicates a memory operation, a native code associated with the specific command code is atomic, and thus specific command codes emulated by the command emulators #1 to #n satisfy the condition C. Thus, the command emulators #1 to #n instantaneously execute native codes obtained by converting the command codes.

The delay process information 312 is described below. FIG. 6 illustrates stored details of the delay process information 312 at the times t2, t3, t7, and t9. Hereinafter, the delay process information 312 at the times is indicated by delay process information 312_tx, where x is the natural numbers.

The delay process information 312 includes an execution field, a delay command emulator number field, a memory address information field, and a memory operation type field. In the execution field, identification information that indicates whether or not a command emulator that is executing the native code string with delay exists is stored. Specifically, in the execution field, an "existence" identifier that indicates that a command emulator that is executing the native code string with delay exists, or an "absence" identifier that indicates that a command emulator that is executing the native code string with delay does not exist, is stored.

In the delay command emulator number field, a number of a command emulator that is executing the native code string with delay is stored. In the memory address information field, a range of memory addresses to be accessed is stored if the type of the command code indicates a "memory operation". In the memory operation type field, the type of the memory operation is stored if the type of the command code indicates the "memory operation". Specifically, in the memory operation type field, as the type of the memory operation, a "writing" identifier that indicates an operation of writing in the memory, or a "reading" identifier that indicates an operation of reading from the memory, is stored.

A stored detail of the delay process information 312 indicates that any command emulator does not execute the native code string with delay at the time t2, as indicated by the delay process information 312_t2 illustrated in FIG. 6, for example.

At the time t3, any command emulator does not execute the native code string with delay, the type of a command code of which the execution is emulated by the command emulator #1 indicates a "memory operation", the command code of which the execution is emulated by the command emulator #1 is not atomic and thus satisfies the condition A. Hence, after the command emulator #1 updates the delay process information 312, the command emulator #1 executes the native code string with delay until the time t6. A specific updated detail indicates that the command emulator #1 executes the native code string with delay at the time t3, as indicated by the delay process information 312_t3 illustrated in FIG. 6.

At the times t4 and t5 when the delay process is executed by the command emulator #1, if the types of command codes to be emulated by command emulators other than the command emulator #1 indicate a memory operation, the command codes satisfy the condition B. In this case, the other command emulators confirm competition between memory operations using the delay process information 312. If the competition does not occur, the other command emulators instantaneously execute native codes associated with the command codes without outputting the log information and converting the command codes.

At the time t7, any command emulator does not execute the native code string with delay, the type of a command code of which the execution is emulated by the command emulator #n indicates a memory operation, the command code of which the execution is emulated by the command emulator #n is not atomic and thus satisfies the condition A. Hence, after the command emulator #n updates the delay process information 312, the command emulator #n executes the native code string with delay until the time t8. As indicated by the delay process information 312_t7 illustrated in FIG. 6, at the time t7, the command emulator #n executes the native code string with delay.

At the time t9, any command emulator does not execute the native code string with delay, the type of a command code of which the execution is emulated by the command emulator #2 indicates a memory operation, the command code of which the execution is emulated by the command emulator #2 is not atomic and thus satisfies the condition A. Hence, after the command emulator #2 updates the delay process information 312, the command emulator #2 executes the native code string with delay until the time t11. As indicated by the delay process information 312_t9, at the time t9, the command emulator #2 executes the native code string with delay, and the type of the memory operation indicates writing.

At the time t10, if the command emulator #n detects competition between access to the memory, the command emulator #n outputs, to the log information 313, information of the command emulator #2 executing the native code string with delay and information of the command emulator #n. A specific example of the output information is described with reference to FIG. 7. The command emulator #n converts a specific command code associated with the native code string with delay and included in the program 111 to be emulated into an atomic specific command code having the same function as the specific command code. Then, the command emulator #n instantaneously executes native codes associated with the specific command code.

FIG. 7 is an explanatory diagram illustrating an example of the log information 313. The log information 313 is information output by a command emulator that detected competition. The log information 313 illustrated in FIG. 7 includes records 701-1 and 701-2. The record 701-1 corresponds to information output by the command emulator #n at the time 10.

The log information 313 includes a field for a competition detection time, a field for information of a command emulator that executes the delay process, and a field for information of a command emulator that detects competition. The competition detection time indicates a time when competition is detected. The field for a command emulator that executes the delay process, and the field for information of a command emulator that detects competition, each include a command emulator number field and a specific command code address field.

In the command emulator number field included in the field for information of a command emulator that executes the delay process, a number of a command emulator that executes the native code string with delay is stored. In the specific command code address field included in the field for information of a command emulator that executes the delay process, an address of a specific command code emulated by the command emulator that executes the delay process is stored. A command emulator that detects competition converts the specific command code stored in the specific command code address field into an atomic specific command code having the same function as the specific command code.

In the command emulator number field included in the field for information of a command emulator that detects competition, a number of a command emulator that detects competition is stored. In the specific command code address field included in the field for information of a command emulator that detects competition, an address of a specific command code emulated by the command emulator that detects the competition is stored.

For example, the record 701-1 indicates that a command code of which the execution is emulated by the command emulator #2 and of which an address is 0x000ABCDE, and a command code of which the execution is emulated by the command emulator #n and of which an address is 0x000ABC0C, compete with each other.

Next, a process that is executed by each of the command emulators #1 to #n is described with reference to FIGS. 8 to 12. In order to simplify the following description, the command emulator #1 that executes the process is mainly described below.

Figure 8:
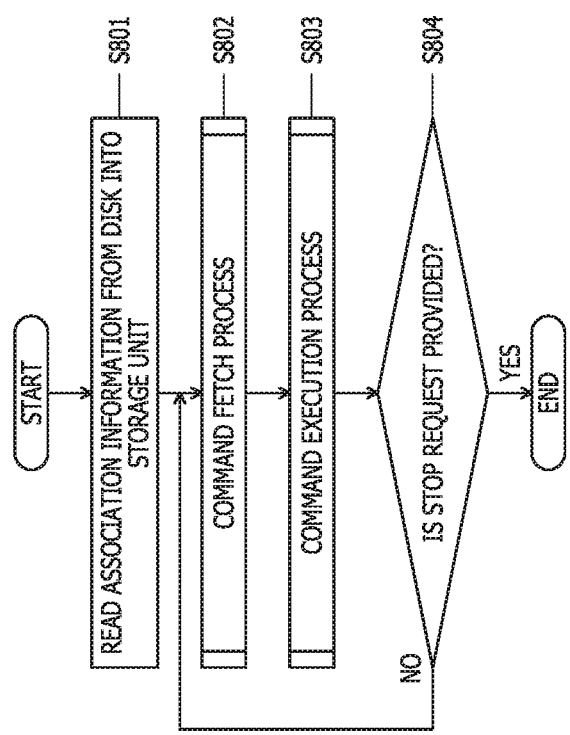
FIG. 8 is a flowchart of an example of a procedure for an exclusive control testing process.

FIG. 8 is a flowchart of an example of a procedure for the exclusive control testing process. The exclusive control testing process is a process of testing the exclusive control of the program 111 to be emulated.

The command emulator #1 reads the association information from the disk 204 into the storage unit 311 (in S801). The process of S801 is executed by any of the command emulators #1 to #n. Then, the command emulator #1 executes a command fetch process (in S802). Next, the command emulator #1 executes a command execution process (in S803). Then, the command emulator #1 determines whether or not a stop request is provided based on the stop of the information processing device 101 or the like (in S804). In this case, the information processing device 101 may activate or stop the command emulators #1 to #n in accordance with an activation instruction or a stop instruction from the operator.

If the stop request is not provided (No in S804), the command emulator #1 causes the exclusive control testing process to the process of S802. If the stop request is provided (Yes in S804), the command emulator #1 terminates the exclusive control testing process. By executing the exclusive control testing process, the command emulator #1 may test the exclusive control of the program 111 to be emulated.

Figure 9:
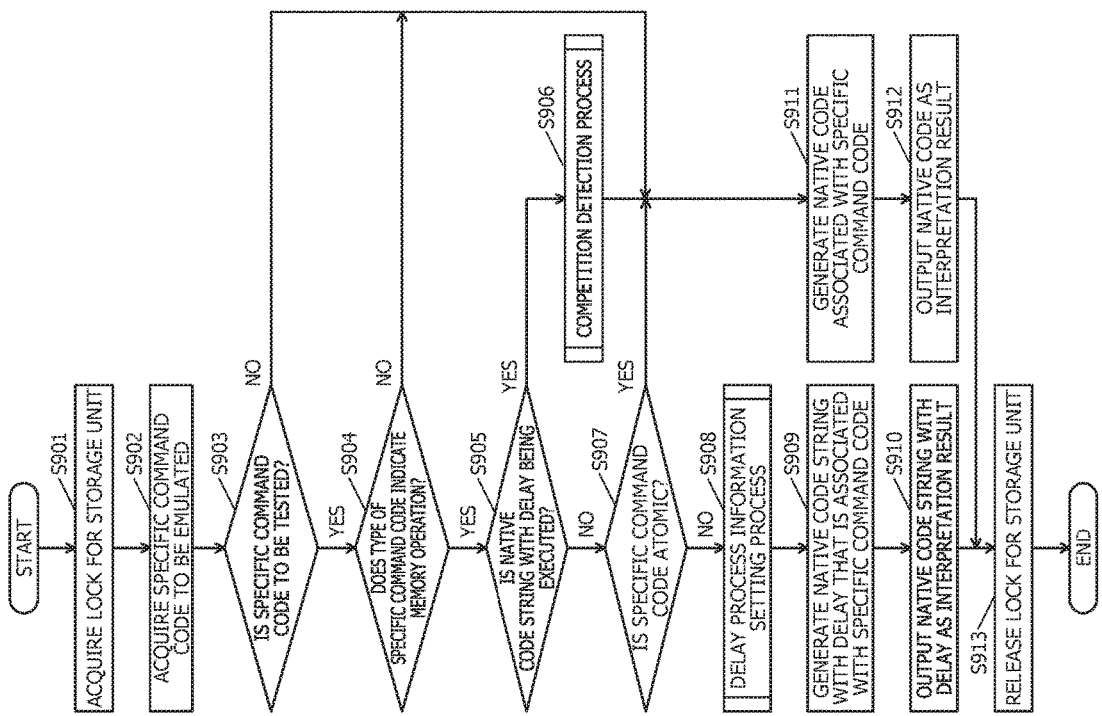
FIG. 9 is a flowchart of an example of a procedure for a command fetch process.

FIG. 9 is a flowchart of an example of a procedure for the command fetch process. The command fetch process is a process of fetching a command code from the program to be emulated.

For the exclusive control executed on the storage unit 311 on the RAM 202 accessible from the command emulators #1 to #n, the command emulator #1 acquires a lock for the storage unit 311 (in S901). Then, the command emulator #1 acquires a specific command code to be emulated (in S902). Then, the command emulator #1 determines, based on a range of addresses of a program specified from an external upon the test and to be tested, whether or not the specific command code is to be tested (in S903). If a program that forms the kernel of the OS is to be tested, the operator specifies, upon the test, values calculated from an address map generated upon the formation of the kernel as the range, to be used to determine whether or not the program is to be tested, of the addresses of the program to be tested.

If the specific command code is to be tested (Yes in S903), the command emulator #1 references the association information 121 and determines whether or not the type of the specific command code indicates a memory operation (in S904). If the type of the specific command code indicates a memory operation (Yes in S904), the command emulator #1 references the delay process information 312 and determines whether or not a command emulator that is executing the native code string with delay exists (in S905). If the command emulator that is executing the native code string with delay exists (Yes in S905), the command emulator #1 executes a competition detection process (in S906). If the command emulator that is executing the native code string with delay exists (Yes in S905), the condition B is satisfied.

On the other hand, if the command emulator that is executing the native code string with delay does not exists (No in S905), the command emulator #1 determines whether or not the specific command code is atomic (in S907). If the specific command code is not atomic (No in S907), the command emulator #1 executes a delay process information setting process (in S908). If the specific command code is not atomic (No in S907), the condition A is satisfied. Then, the command emulator #1 generates the native code string with delay that is associated with the specific command code (in S909). Next, the command emulator #1 outputs the generated native code string with delay as an interpretation result (in S910).

After the termination of the process of S906, or if the specific command code is not to be tested (No in S903), or if the type of the specific command code does not indicate a memory operation (No in S904), or if the specific command code is atomic (Yes in S907), the command emulator #1 generates a native code associated with the specific command code (in S911). Then, the command emulator #1 outputs the generated native code as an interpretation result (in S912).

After the termination of the process of S910 or S912, the command emulator #1 releases the lock for the storage unit 311 (in S913). After the termination of the process of S913, the command emulator #1 terminates the command fetch process. By executing the command fetch process, the command emulator #1 may fetch the command code from the program 111 to be emulated.

Figure 10:
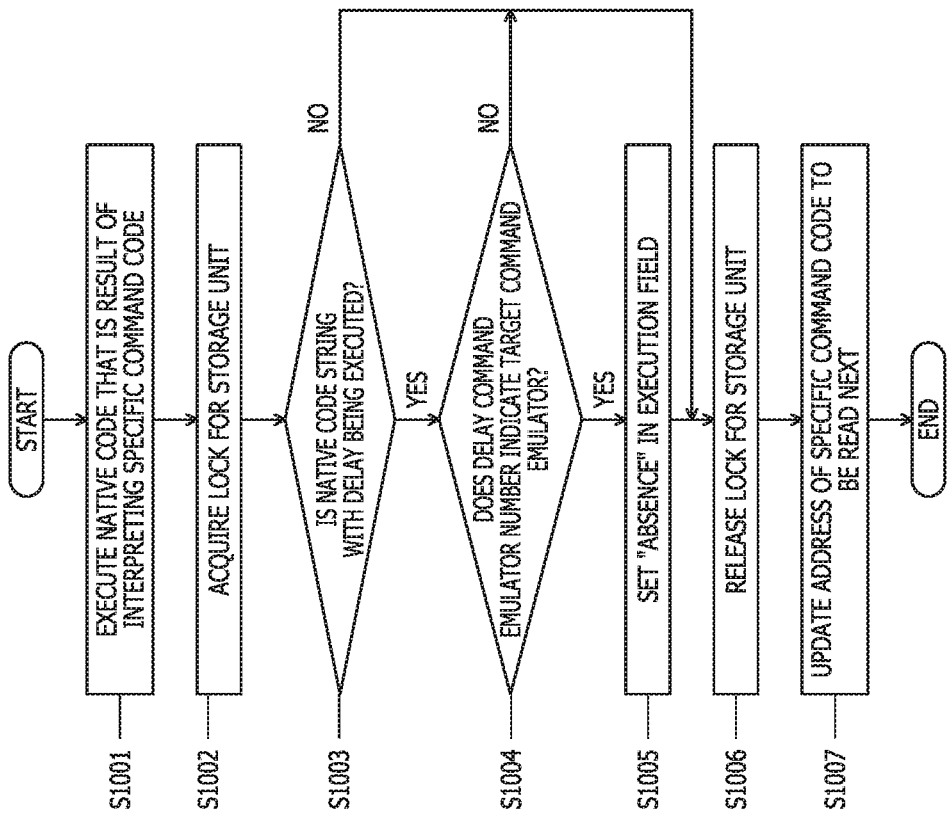
FIG. 10 is a flowchart of an example of a procedure for a command execution process.

FIG. 10 is a flowchart of an example of a procedure for the command execution process. The command execution process is a process of executing a native code associated with a command code.

The command emulator #1 executes the native code that is the result of interpreting the specific command code (in S1001). Then, the command emulator #1 acquires the lock for the storage unit 311 (in S1002). Then, the command emulator #1 references the delay process information 312 and determines whether or not a command emulator that is executing the native code string with delay exists (in S1003).

If the command emulator that is executing the native code string with delay exists (Yes in S1003), the command emulator #1 references the delay process information 312 and determines whether or not a delay command emulator number indicates the target command emulator #1 (in S1004). If the delay command emulator number indicates the target command emulator #1 (Yes in S1004), the command emulator #1 sets "absence" in the execution field of the delay process information 312 (in S1005).

After the termination of the process of S1005, or if the command emulator that is executing the native code string with delay does not exist (No in S1003), or if the delay command emulator number does not indicate the target command emulator #1 (No in S1004), the command emulator #1 releases the lock for the storage unit 311 (in S1006). Then, the command emulator #1 updates an address of a specific command code to be read next from the program 111 to be emulated (in S1007). After the termination of the process of S1007, the command emulator #1 terminates the command execution process. By executing the command execution process, the command emulator #1 may execute the native code associated with the command code and emulate the execution of the command code.

Figure 11:
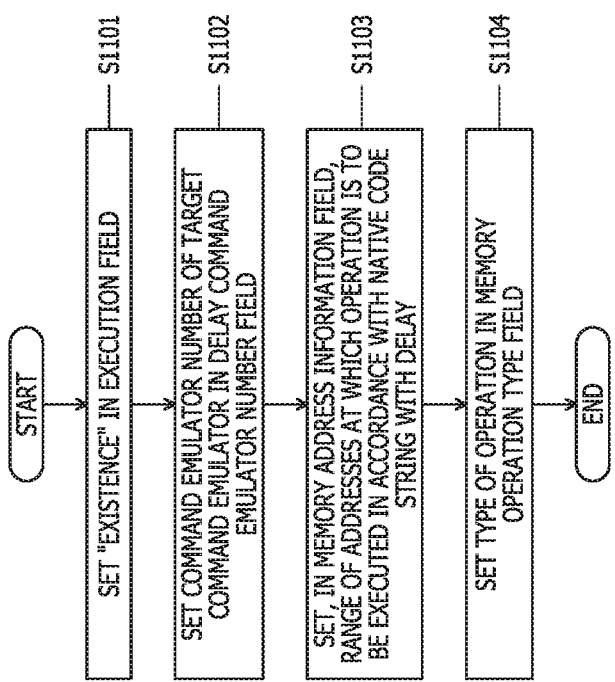
FIG. 11 is a flowchart of an example of a procedure for a delay process information setting process.

FIG. 11 is a flowchart of an example of a procedure for the delay process information setting process. The delay process information setting process is a process of setting the delay process information 312.

The command emulator #1 sets "existence" in the execution field of the delay process information 312 (in S1101). Then, the command emulator #1 sets the command emulator number of the target command emulator #1 in the delay command emulator number field of the delay process information 312 (in S1102). Then, the command emulator #1 sets, in the memory address information field of the delay process information 312, a range of addresses at which the operation is to be executed in accordance with the native code string with delay (in S1103). Then, the command emulator #1 sets the type of the operation in the memory operation type field of the delay process information 312 (in S1104).

After the termination of the process of S1104, the command emulator #1 terminates the delay process information setting process. By executing the delay process information setting process, the command emulator #1 may set the delay process information 312.

Figure 12:
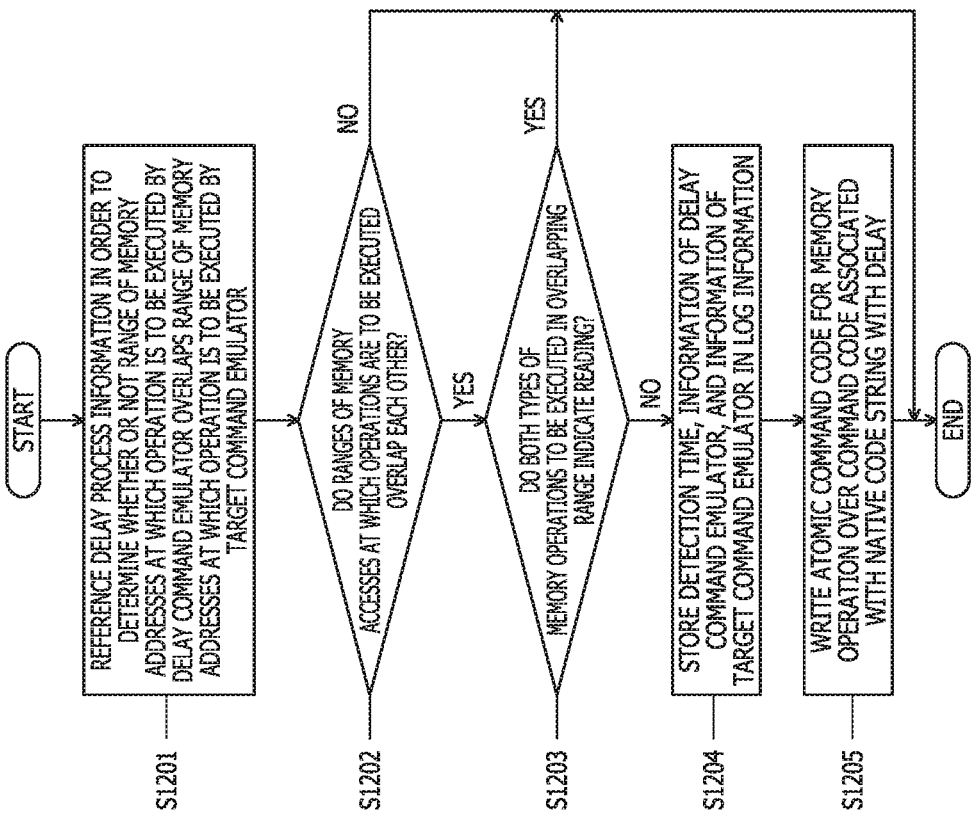
FIG. 12 is a flowchart of an example of a procedure for a competition detection process.

FIG. 12 is a flowchart of an example of a procedure for the competition detection process. The competition detection process is a process of detecting competition between operations of accessing the memory.

The command emulator #1 references the delay process information 312 in order to determine whether or not a range of memory addresses at which an operation is to be executed by a delay command emulator overlaps a range of memory addresses at which the operation is to be executed by the target command emulator #1 (in S1201). Then, the command emulator #1 determines whether or not the range of the memory addresses at which the operation is to be executed by the delay command emulator overlaps the range of the memory addresses at which the operation is to be executed by the command emulator #1 (in S1202). If the range of the memory addresses at which the operation is to be executed by the delay command emulator overlaps the range of the memory addresses at which the operation is to be executed by the command emulator #1 (Yes in S1202), the command emulator #1 determines whether or not both types of the memory operations to be executed in the overlapping range indicate reading (in S1203).

If both types of the memory operations to be executed in the overlapping range do not indicate reading (No in S1203), the command emulator #1 detects competition and stores, in the log information 313, a detection time, information of the delay command emulator, and information of the target command emulator #1 (in S1204). Then, the command emulator #1 writes an atomic command code for executing the memory operation over the command code associated with the native code string with delay and included the program 111 to be emulated (in S1205).

After the termination of the process of S1205, or if the range of the memory addresses at which the operation is to be executed by the delay command emulator does not overlap the range of the memory addresses at which the operation is to be executed by the command emulator #1 (No in S1202), or if the types of the memory operations to be executed in the overlapping range indicate reading (Yes in S1203), the command emulator #1 terminates the competition detection process. If the operations of accessing the memory compete with each other, the command emulator #1 may modify the command code causing the competition by executing the competition detection process.

As described above, if a specific command code to be emulated is for a memory operation and is associated with multiple non-atomic native codes, the information processing device 101 generates a native code string including the delay process inserted between the native codes. During the delay process executed by a certain processor 102, a memory operation by another processor 102 is increased and a failure of the exclusive control may be easily detected by the execution of the native code string including the delay process.

If the information processing device 101 determines that the type of the first code indicates access to the memory, the information processing device 101 may detect competition between the first code and access to the memory by the other processor in accordance with the native code string 114 with delay that is associated with the second code. Thus, the information processing device 101 may notify the operator of the information processing device 101 that the information processing device 101 detected a failure of the exclusive control. Then, the operator of the information processing device 101 may handle the detected failure.

If the information processing device 101 detects competition, the information processing device 101 may convert the second code within the program 111 to be emulated into a code having the same function as the second code and associated with an atomic native code. Thus, the information processing device 101 may correct a failure of the exclusive control. If the execution of the program 111 to be emulated is to be repeatedly emulated, the information processing device 101 may suppress the detection of a failure of the exclusive control at the same part and execute the process of detecting a failure of the exclusive control at different parts.

Only if the condition A is satisfied, the information processing device 101 may execute the native code string 114 with delay that is associated with the first code. Thus, the information processing device 101 may suppress the occurrence of a failure of the exclusive control while suppressing an unwanted increase in an execution time of the program 111 to be emulated. Although the number of processors that may simultaneously execute the native code string 114 with delay is 1 in the above description, processors of which the number is up to n−1 may simultaneously execute the native code string 114 with delay. The maximum number of processors that may simultaneously execute the native code string 114 with delay may be specified by the operator of the information processing device 101. For example, the operator of the information processing device 101 specifies the maximum number of processors that may simultaneously execute the native code string 114 with delay, based on the size of the program 111 to be emulated and the number of processors included in the information processing device 101.

The information processing method described in the embodiment may be achieved by causing the computer such as a personal computer or a workstation to execute a prepared program. The information processing program is stored in a computer-readable storage medium such as a hard disk, a flexible disk, a compact disc-read only memory (CD-ROM), or a digital versatile disc (DVD) and read by the computer from the storage medium and executed by the computer. The information processing program may be distributed through a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising, a memory and a plurality of processors coupled to the memory, wherein one of the plurality of processors is configured to:
   acquire a first command code from a plurality of command codes included in a program to be emulated, the plurality of command codes to be emulated by the plurality of processors;
   determine whether or not a plurality of native codes corresponding to the acquired first command code are for the atomic operation and that the first command code accesses a memory, by referring association information with which a plurality of native codes which correspond to a command code included in the program to be emulated, a type of the command code, and information indicating whether the plurality of native codes are for an atomic operation, the plurality of native codes being executable by the plurality of processors, wherein the association information further includes association relationships between certain command codes associated with non-atomic native codes that are not for the atomic operation and command codes having the same functions as the certain command codes and associated with native codes that are for the atomic operation; and generate, by referring the association information, a modified native code string with delay in which a certain command code for delaying the completion of executing the plurality of native codes is inserted in the plurality of native codes corresponding to the first command code when the one of the plurality of processors determines that the plurality of native codes corresponding to the first command code are not for the atomic operation and that the first command code accesses the memory;

when a memory access competition is detected, convert, based on the association information, the first command code into a command code having the same function as the first command code and corresponding to a native code that is for the atomic operation.

2. The information processing device according to claim 1, wherein the one of the plurality of processors is further configured to detect the memory access competition between memory access of the modified native code string corresponding to the first command code and a memory access of a native code string corresponding to a second command code included in the program which is to be emulated by another processor other than the one of the plurality of processors that emulates the first command code.

3. The information processing device according to claim 1, wherein the one of the plurality of processors is further configured to:

determine whether another processor, which is other than the one of the plurality of processors, executes a second modified native code string with delay corresponding to a second command code included in the program, the second modified native code string being generated by inserting the certain command code in a plurality of native codes corresponding to the second command code when the processing circuitry determines that the plurality of native codes corresponding to the second command code are not for the atomic operation and that the second command code accesses the memory; and execute the generated modified native code string with delay when the another processor is determined to be not executing the second modified native code string with delay corresponding to the second command code.

4. A method comprising:

acquiring, by one of a plurality of processors, a first command code from a plurality of command codes included in a program to be emulated, the plurality of command codes to be emulated by the plurality of processors;

determining, by the one of the plurality of processors, whether or not a plurality of native codes corresponding to the acquired first command code are for the atomic operation and that the first command code accesses a memory, by referring association information with which a plurality of native codes which correspond to a command code included in the program to be emulated, a type of the command code, and information indicating whether the plurality of native codes are for an atomic operation, the plurality of native codes being executable by the plurality of processors, wherein the association information further includes association relationships between certain command codes associated with non-atomic native codes that are not for the atomic operation and command codes having the same functions as the certain command codes and associated with native codes that are for the atomic operation; and generating, by the one of the plurality of processors, by referring the association information, a modified native code string with delay in which a certain command code for delaying the completion of executing the plurality of native codes is inserted in the plurality of native codes corresponding to the first command code when the one of the plurality of processors determines that the plurality of native codes corresponding to the first command code are not for the atomic operation and that the first command code accesses the memory;

when a memory access competition is detected, converting, based on the association information, the first command code into a command code having the same function as the first command code and corresponding to a native code that is for the atomic operation.

5. The method according to claim 4, further comprising:

detecting the memory access competition between memory access of the modified native code string corresponding to the first command code and a memory access of a native code string corresponding to a second command code included in the program which is to be emulated by another processor other than the one of the plurality of processors that emulates the first command code.

6. The method according to claim 4, further comprising:

determining whether another processor, which is other than the one of the plurality of processors, executes a second modified native code string with delay corresponding to a second command code included in the program, the second modified native code string being generated by inserting the certain command code in a plurality of native codes corresponding to the second command code when the processing circuitry determines that the plurality of native codes corresponding to the second command code are not for the atomic operation and that the second command code accesses the memory; and executing, by the one of the plurality of processors, the generated modified native code string with delay when the another processor is determined to be not executing the second modified native code string with delay corresponding to the second command code.

7. A non-transitory computer readable medium having stored therein a program that causes a computer to execute a process, the process comprising:

acquiring a first command code from a plurality of command codes included in a program to be emulated, the plurality of command codes to be emulated by a plurality of processors which emulate execution of the program to be emulated;

determining whether or not a plurality of native codes corresponding to the acquired first command code are for the atomic operation and that the first command code accesses a memory, by referring association information with which a plurality of native codes which correspond to a command code included in the program to be emulated, a type of the command code, and information indicating whether the plurality of native codes are for an atomic operation, the plurality of native codes being executable by the plurality of processors, wherein the association information further includes association relationships between certain command codes associated with non-atomic native codes that are not for the atomic operation and command codes having the same functions as the certain command codes and associated with native codes that are for the atomic operation; and generating, by referring the association information, a modified native code string with delay in which a certain command code for delaying the completion of executing the plurality of native codes is inserted in the plurality of native codes corresponding to the first command code when the one of the plurality of processors determines that the plurality of native codes corresponding to the first command code are not for the atomic operation and that the first command code accesses the memory;

when a memory access competition is detected, converting, based on the association information, the first command code into a command code having the same function as the first command code and corresponding to a native code that is for the atomic operation.

8. The non-transitory computer readable medium according to claim 7, wherein the process further comprises:

detecting the memory access competition between memory access of the modified native code string corresponding to the first command code and a memory access of a native code string corresponding to a second command code included in the program which is to be emulated by another processor other than the one of the plurality of processors that emulates the first command code.

9. The non-transitory computer readable medium according to claim 7, wherein the process further comprises:

determining whether another processor, which is other than the one of the plurality of processors, executes a second modified native code string with delay corresponding to a second command code included in the program, the second modified native code string being generated by inserting the certain command code in a plurality of native codes corresponding to the second command code when the processing circuitry determines that the plurality of native codes corresponding to the second command code are not for the atomic operation and that the second command code accesses the memory; and executing the generated modified native code string with delay when the another processor is determined to be not executing the second modified native code string with delay corresponding to the second command code.

* * * * *